(12) United States Patent
Caspa

(10) Patent No.: US 9,631,426 B1
(45) Date of Patent: Apr. 25, 2017

(54) AUTOMATIC WINDOW BLIND SYSTEM

(71) Applicant: Martin Caspa, Corona, CA (US)

(72) Inventor: Martin Caspa, Corona, CA (US)

(*) Notice: Subject to any disclaimer, the term of this patent is extended or adjusted under 35 U.S.C. 154(b) by 73 days.

(21) Appl. No.: 14/629,798

(22) Filed: Feb. 24, 2015

(51) Int. Cl.
E06B 7/086 (2006.01)
E06B 9/68 (2006.01)
E06B 9/36 (2006.01)
E06B 9/24 (2006.01)

(52) U.S. Cl.
CPC .............. *E06B 9/68* (2013.01); *E06B 9/364* (2013.01); *E06B 9/368* (2013.01); *E06B 2009/2476* (2013.01); *E06B 2009/6827* (2013.01)

(58) Field of Classification Search
CPC ... E06B 9/68; E06B 9/36; E06B 9/364; E06B 9/368; E06B 2009/6809; E06B 2009/6818; E06B 2009/6827; E06B 2009/2476; E06B 7/096
See application file for complete search history.

(56) References Cited

U.S. PATENT DOCUMENTS

| 3,299,943 A * | 1/1967 | Poe .................. E06B 9/362 160/176.1 V |
| 3,860,055 A | 1/1975 | Wild |
| 4,563,629 A * | 1/1986 | Keiper .................. H02J 7/027 320/134 |
| 4,644,990 A | 2/1987 | Webb, Sr. et al. |
| 5,883,480 A | 3/1999 | Domel et al. |
| 6,094,864 A * | 8/2000 | Hsu .................. E06B 7/096 49/82.1 |
| 7,353,636 B1 * | 4/2008 | Anderson .............. E06B 7/086 49/74.1 |
| 7,816,879 B2 * | 10/2010 | Taheri .................... E05F 15/63 318/266 |
| 8,302,938 B2 * | 11/2012 | Ebeling .................. E04H 17/16 256/1 |
| 9,328,906 B1 * | 5/2016 | Bennington ........... F21V 23/04 |
| 2005/0099151 A1 * | 5/2005 | Lee .................... E06B 9/68 318/640 |
| 2006/0000558 A1 * | 1/2006 | Fennell .................. E06B 9/42 160/7 |
| 2009/0059574 A1 * | 3/2009 | Lewis .................... E06B 9/28 362/183 |
| 2015/0191970 A1 * | 7/2015 | Yu ....................... E06B 9/262 160/84.02 |

* cited by examiner

Primary Examiner — Katherine Mitchell
Assistant Examiner — Abe Massad
(74) Attorney, Agent, or Firm — Stevenson IP, LLC

(57) ABSTRACT

The automatic window blind system provides gear driven window blind control. A solar power with back up battery provides energy to operate the window blinds and a light emitting diode strip that changes light colors depending upon daylight and night conditions. A plurality of toothed rack drives is driven by and drives rack gears in ensuring a positive operation of window blind hooks in pivoting window blinds that snap into the window blind hooks. A printed wiring board assembly controls functions and is accompanied by a rack sensor that cooperates with an optical sensor. The optical sensor and the rack sensor automatically position window blinds based upon light intensity.

15 Claims, 6 Drawing Sheets

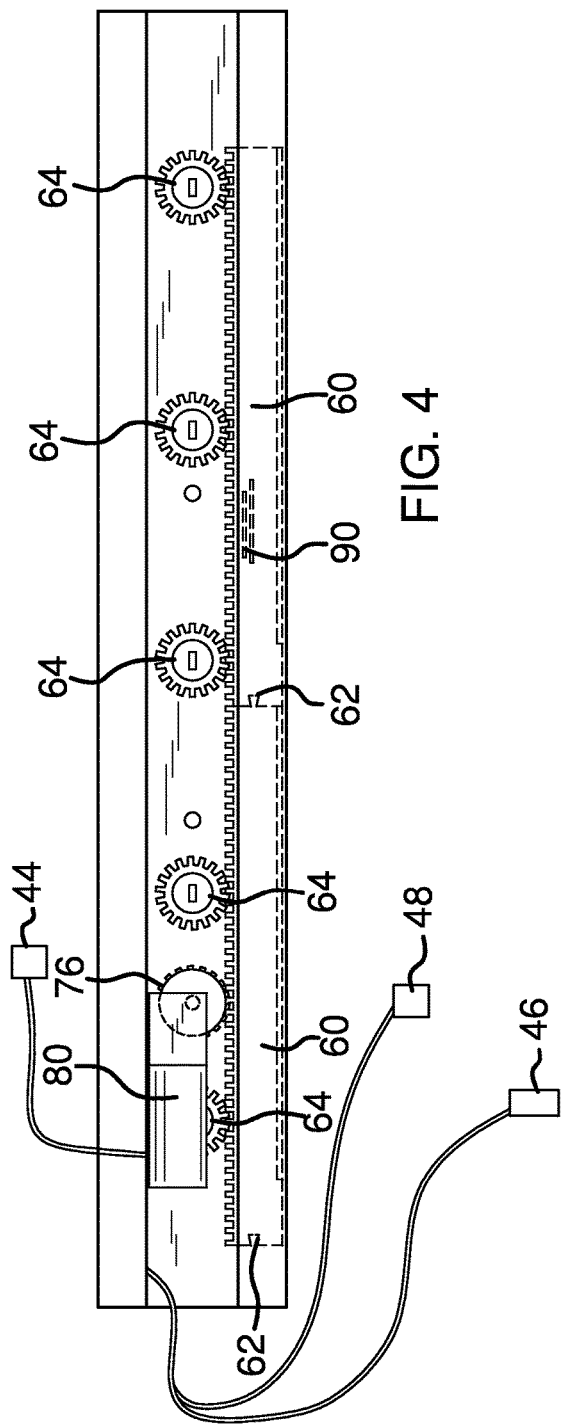
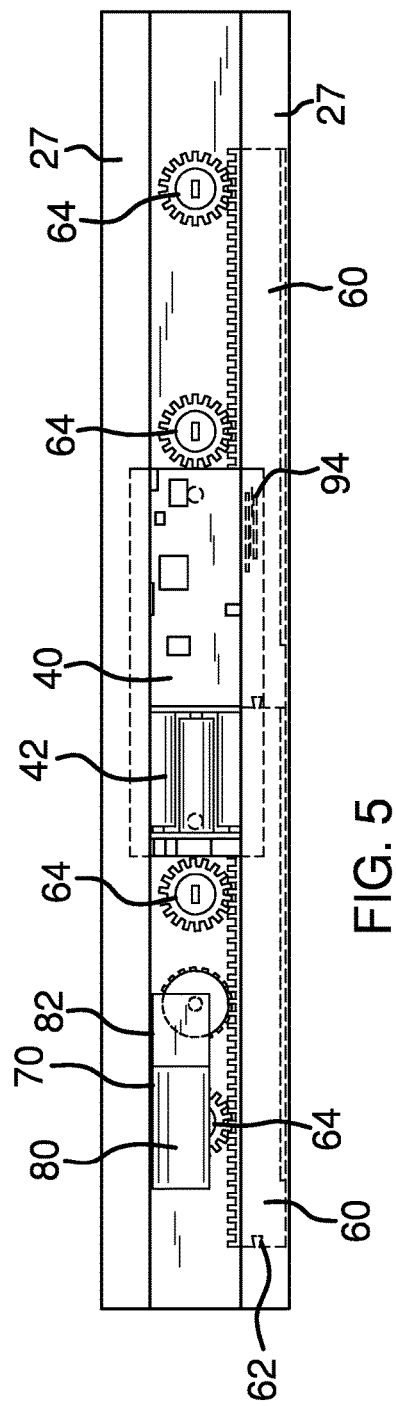
FIG. 4
FIG. 5

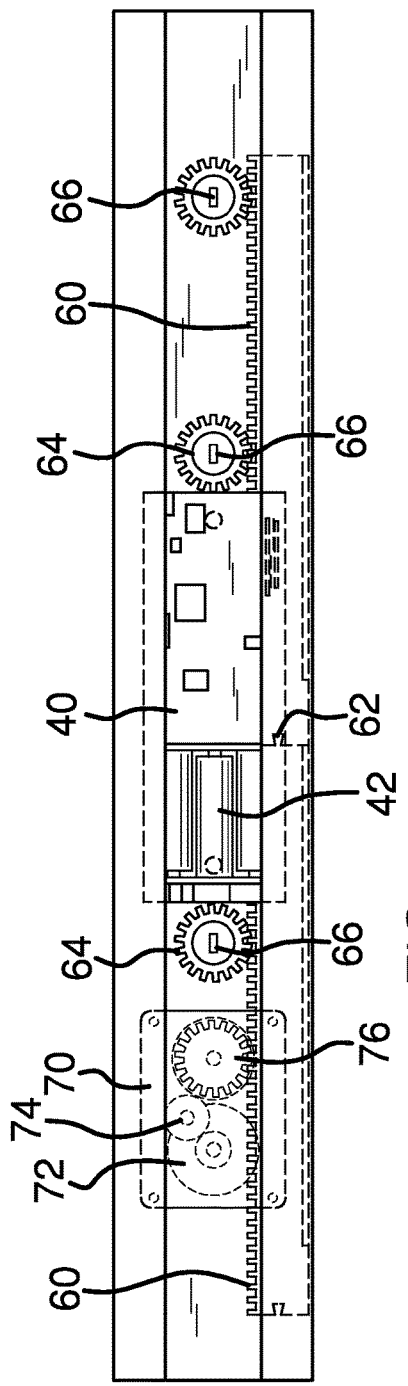
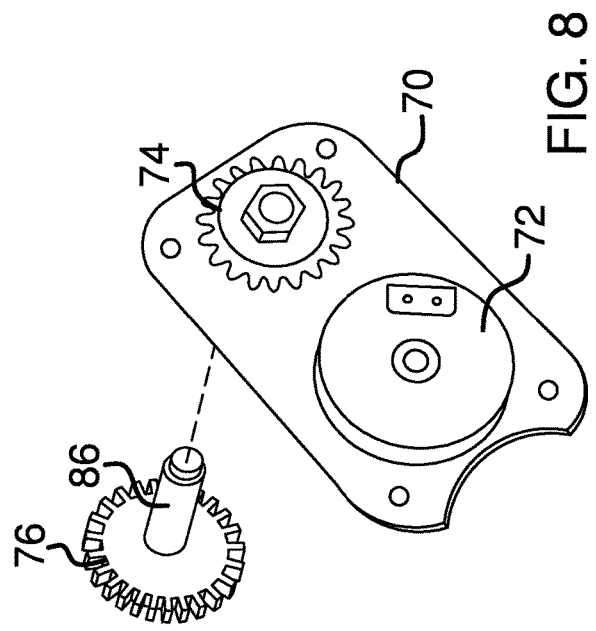
FIG. 7
FIG. 8

AUTOMATIC WINDOW BLIND SYSTEM

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable
To all Whom it May Concern
Be it known that I, Martin Caspa, a citizen of the United States, have invented new and useful improvements in an automatic window blind system as described in this specification.

BACKGROUND OF THE INVENTION

Various types of automatic window blind devices have long been known in the prior art. Use and sometimes evolution of such devices have often taught a lack or durability and a lack of automation. Worm gear driven window systems are especially prone to failure, whether human actuated or electrically actuated. One need of automatic window blind apparatus is modular construction wherein various parts are easily replaceable and neither the entire apparatus nor any part yields what is commonly referred to as a throw-away apparatus. Modularity could also provide for variation in sizing of an automatic window blind. As noted, durability is extremely important. Further, a need exists for automatic window blinds that operate by electronic sensing lighting conditions. For example, a sunlight sensing window blind that reacts to light intensity, in opening partially, fully, and closing would be of great convenience. Such window blinds would also add security to a structure by closing at night, therein limiting visual access to a home or office that often invites invasion. Allowing light access during the day, and even limiting intense light could provide utility cost savings and natural light. Providing solar power with battery backup could offer further savings and limit wiring costs as well as providing light from solar generated and stored power. The present automatic window blind system provides these advantages.

FIELD OF THE INVENTION

The present automatic window blind system relates to electrically operated window blind systems, and more especially to an electrically operated window blind system that is solar powered and automatically moves window blinds from an open position to a closed position and to various relative positions therebetween.

SUMMARY OF THE INVENTION

The general purpose of the automatic window blind system, described subsequently in greater detail, is to provide an automatic window blind system that has many novel features that result in an automatic window blind system which is not anticipated, rendered obvious, suggested, or even implied by prior art, either alone or in combination thereof.

To accomplish this, the automatic window blind system comprises an electromechanical housing having a solar panel front side and a back side spaced apart from the front side, a first end and a second end spaced apart from the first end. The electromechanical housing also has a top side having a pair of spaced apart head rails. One of each head rail is attached to one of each of the front side and the back side. A continuous opening is disposed between the head rails. A top cover is removably attached to the head rails. Providing an internal access via the head rails and removable top cover enables repair and replacement of parts as might be needed. A bottom shelf is spaced apart from the head rails. A pair of end caps is provided. One of each end cap closes the first end and the second end. The removable A plurality of spaced apart blind attachment orifices is disposed within the bottom shelf. A plurality of blind hooks is provided, with one of each blind hook removably and rotatably disposed within one of each blind attachment orifices.

A plurality of spaced apart window blind attachment orifices is disposed within the bottom shelf. A plurality of window blind hooks is provided, with one of each window blind hook removably and rotatably disposed within one of each window blind attachment orifices.

A plurality of toothed rack drives is slidably disposed within the electromechanical housing. Each rack drive has a perpendicularly affixed rack guide to locate and to guide each toothed rack guide within the electromechanical housing. A rack connection is disposed on an each end of each toothed rack drive and therein provides for modularity in reducing and extending a length of the window blind system. At least one of the plurality of toothed rack drives is selectively attached to at least one additional toothed rack drive via one of the rack connections.

A plurality of substantially equally spaced apart rack gears is provided. One of each rack gear is in rotationally operational communication with one of each window blind attachment orifice. A window blind hook notch is disposed within each rack gear, wherein one of each of the plurality of window blind hooks is removably fitted to one of each of the plurality of rack gears. Window blind hooks are known in the art.

A power assembly is disposed within the electromechanical housing. The power assembly has a motor and a plurality of operationally communicating gears. Due to production concerns, two power assemblies are available. A cylindrical motor with a gear reduction drives a first bevel gear. The first bevel gear drives a second bevel gear. An axle connects the second bevel gear to the drive gear. The drive gear moves the toothed rack drive toward the first end and alternately toward the second end. Movement of the toothed rack drives turns the rack gears which in turn rotate the window blind hooks. The window blind hooks are fitted with window blinds that are well known in the art. Providing one rack gear for each window blind ensures far more operational integrity and longevity than do other designs.

An additional power assembly provides a pancake motor. The pancake motor drives an internal planetary gear that is in communication with the drive gear via the axle. The drive gear propels the tooth rack drives. Both types of power assemblies are available. The pancake motor, the planetary gear, the drive gear, and the rack drives have an advantage of parallel operation. The drive gear is in operational communication with at least one of the plurality of toothed rack drives. At least one of the plurality of rack drives is slidably moved within the electromechanical housing. Due to the dove tailed rack connections, all toothed rack drives are slidably moved without the expense and complexity that fasteners would require. All of the plurality of rack gears is rotated by at least one of the plurality of toothed rack drives. Each of one of the plurality of rack gears rotates one of the plurality of window blind hooks wherein one of each of the plurality of window blind hooks rotates an existing window blind.

An optical sensor is disposed on the PWBA. A rack sensor is disposed on one of the plurality of toothed rack drives. The optical sensor is in operational communication with the rack sensor and the PWBA such that light intensity controls a revolution of the cylindrical motor and the pancake motor via PWBA instruction. A sunlight intensity sensed by the solar panel front side causes a change in voltage within the PWBA, which in turn determines an angular positioning of the window blinds automatically. The removable top cover protects parts within the electrical mechanical housing and at the same time allows access for parts repair and replacement.

Thus has been broadly outlined the more important features of the present automatic window blind system so that the detailed description thereof that follows may be better understood and in order that the present contribution to the art may be better appreciated.

BRIEF DESCRIPTION OF THE DRAWINGS

Figures

FIG. 4 is a top plan view.

FIG. 5 is a top plan view including a printed wiring board assembly ("PWBA").

FIG. 7 is a cutaway top plan view with a pancake motor power assembly.

FIG. 8 is an exploded view of the power assembly with the pancake motor.

DETAILED DESCRIPTION OF THE DRAWINGS

Figure 1:
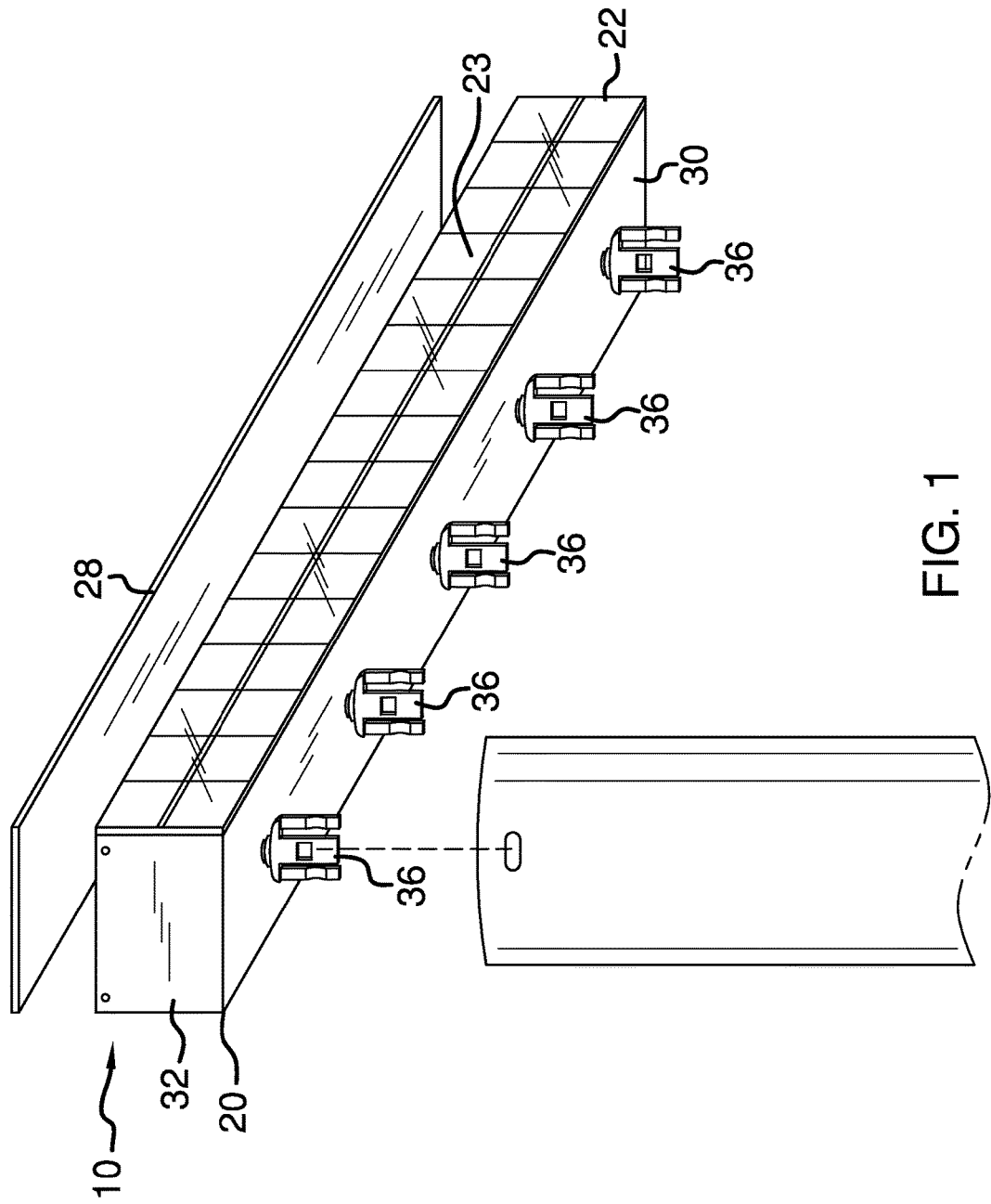
FIG. 1 is a front side partially exploded perspective, view.
Figure 2:
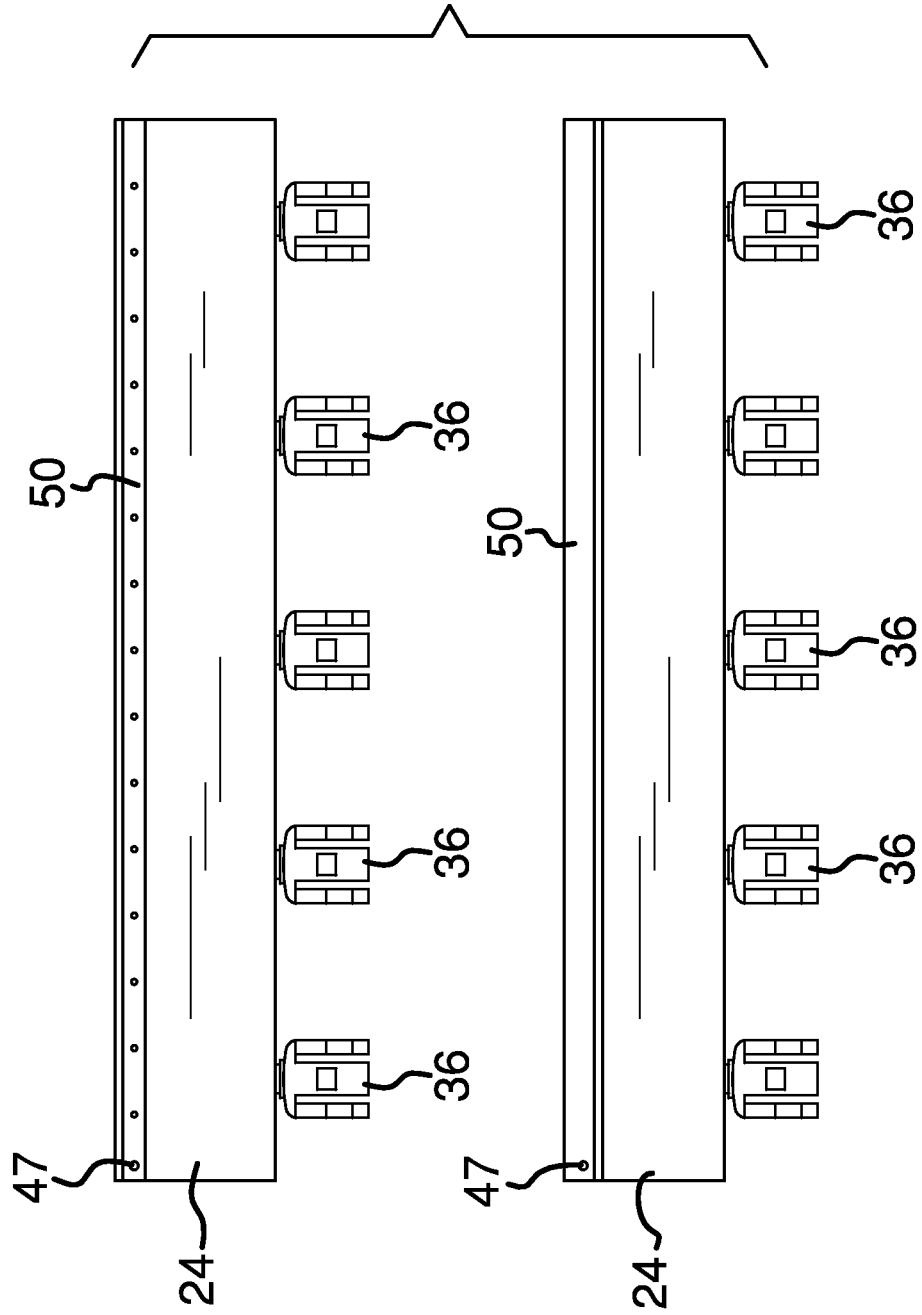
FIG. 2 is a back side view with light emitting diode ("LED") strip lit and unlit.
Figure 3:
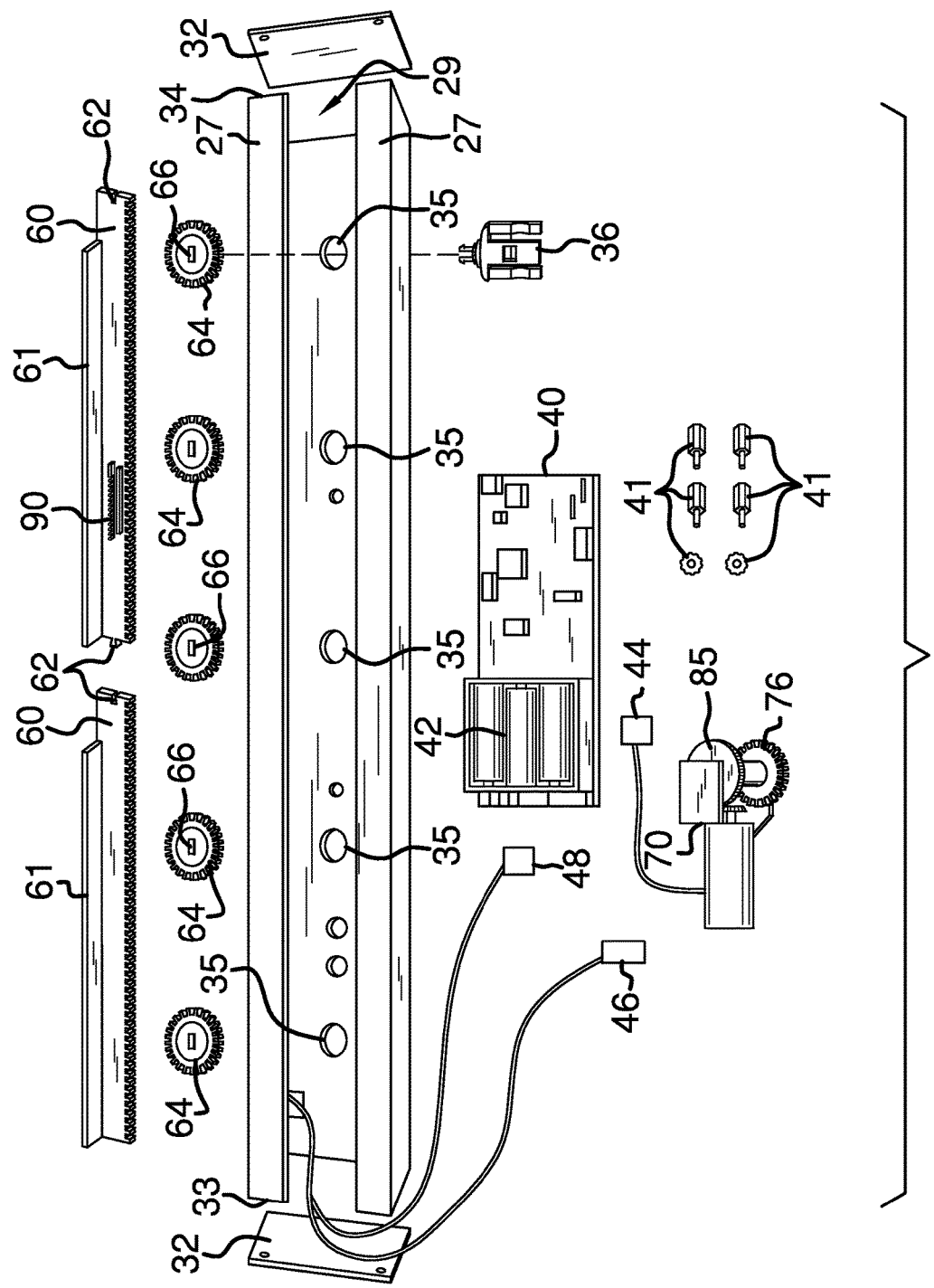
FIG. 3 is an exploded view.
Figure 6:
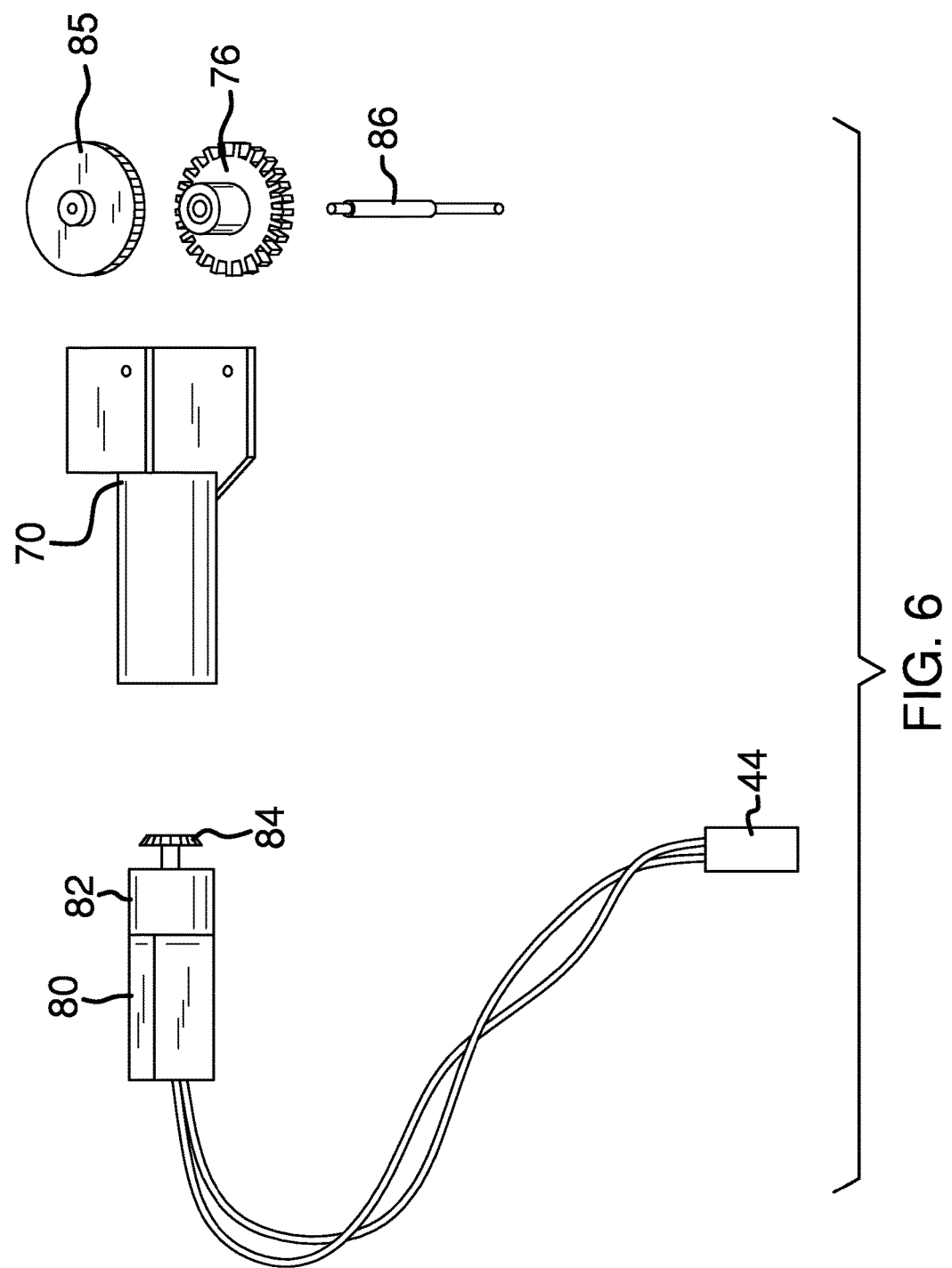
FIG. 6 is an exploded view of a power assembly with a cylindrical motor.

With reference now to the drawings, and in particular FIGS. 1 through 8 thereof, an example of the automatic window blind system employing the principles and concepts of the present automatic window blind system and generally designated by the reference number 10 will be described.

Referring to FIGS. 1 through 8, the automatic window blind system 10 has an electromechanical housing 20 having a front side 22 and a back side 24 spaced apart from the front side 22, a first end 33 and a second end 34 spaced apart from the first end 33. A solar panel 23 is disposed on the front side 22. The electromechanical housing 20 also has a top side 26 having a pair of spaced apart L-shaped head rails 27. One of each head rail 27 is attached to one of each of the front side 22 and the back side 24. A continuous opening 29 is disposed between the head rails 27. A top cover 28 is removably attached to the head rails 27. A bottom shelf 30 is spaced apart from the head rails 27. A pair of end caps 32 is provided. One of each end cap 32 closes a first end 33 and a second end 34 spaced apart from the first end 33, respectively.

A plurality of spaced apart window blind attachment orifices 35 is disposed within the bottom shelf 30. A plurality of window blind hooks 36 is provided, with one of each window blind hook 36 removably and rotatably disposed within one of each window blind attachment orifices 35.

A printed wiring board assembly ("PWBA") 40 is affixed within the electromechanical housing 20. At least one battery 42 is fastened to and in communication with the PWBA 40. A motor connection 44 removably attaches to the PWBA 40. A charging and power harness 46 removably attaches to the PWBA 40. A light emitting diode ("LED") harness 48 removably attaches to the PWBA 40. A light emitting diode strip 50 is disposed on the back side 24. The PWBA is affixed to the electromechanical housing 20 by a plurality of stand off fasteners 41. A charging indicator 47 disposed within the back side 24 communicates with the PWBA 40 via the charging and power harness 46.

A plurality of toothed rack drives 60 is slidably disposed within the electromechanical housing 20. Each rack drive 60 has a perpendicularly affixed rack guide 61 to locate and to guide each toothed rack guide 60 within the electromechanical housing 20. A rack connection 62 is disposed on an each end of each toothed rack drive 60 and therein provides for modularity in reducing and extending a length of the window blind system 10. At least one of the plurality of toothed rack drives 60 is selectively attached to at least one additional toothed rack drive 60 via one of the rack connections 62.

A plurality of substantially equally spaced apart rack gears 64 is provided. One of each rack gear 64 is in rotationally operational communication with one of each window blind attachment orifice 35. A window blind hook notch 66 is disposed within each rack gear 64, wherein one of each of the plurality of window blind hooks is removably fitted to one of each of the plurality of rack gears 64. Window blind hooks are known in the art.

A power assembly 70 is disposed within the electromechanical housing 20. The power assembly 70 has a motor and a plurality of operationally communicating gears. Due to production concerns, two power assemblies 70 are available. A cylindrical motor 80 with a gear reduction 82 drives a first bevel gear 84. The first bevel gear 84 drives a second bevel gear 85. An 86 axle connects the second bevel gear 85 to the drive gear 76. The drive 76 gear moves the toothed rack drive 60 toward the first end 33 and alternately toward the second end 34. Movement of the toothed rack drives 60 turns the rack gears 64 which in turn rotate the window blind hooks 36. The window blind hooks 36 are fitted with window blinds that are well known in the art.

An additional power assembly 70 provides a pancake motor 72. The pancake motor 72 drives an internal planetary gear 74 that is in communication with the drive gear 76 via the axle 86. The drive gear 76 propels the tooth rack drives 60. Both types of power assemblies 70 are available. The pancake motor 72, the planetary gear 74, the drive gear 76, and the rack drives 60 have an advantage of parallel operation. The drive gear 76 is in operational communication with at least one of the plurality of toothed rack drives 60. At least one of the plurality of rack drives 60 is slidably moved within the electromechanical housing 20. Due to the rack connections 62, all toothed rack drives 60 are slidably moved. All of the plurality of rack gears 64 is rotated by at least one of the plurality of toothed rack drives 60. Each of one of the plurality of rack gears 64 rotates one of the plurality of window blind hooks 36 wherein one of each of the plurality of window blind hooks 36 rotates an existing window blind.

An optical sensor 94 is disposed on the PWBA 40. A rack sensor 90 is disposed on one of the plurality of toothed rack drives 60. The optical sensor 94 is in operational communication with the rack sensor 90 and the PWBA 40 such that light intensity controls a revolution of the cylindrical motor 80 and the pancake motor 72 via PWBA 40 instruction. A light intensity sensed by the solar panel front side 22 causes a change in voltage within the PWBA 40, which in turn determines an angular positioning of the window blinds automatically.

What is claimed is:

1. An automatic window blind system comprising:
   an electromechanical housing having a front side and a back side spaced apart from the front side, a first end and a second end spaced apart from the first end, a top side having a pair of spaced apart L-shaped head rails, one of each head rail attached to one of each of the front side and the back side, a continuous opening disposed between the head rails, a top cover removably attached to the head rails, a bottom shelf spaced apart from the head rails between the front side and the back side, a pair of end caps, one of each end cap affixed to the first end and the second end;
   a solar panel disposed on the front side;
   a plurality of equally spaced apart window blind attachment orifices disposed within the bottom shelf;
   a plurality of window blind hooks, one of each window blind hook removably and rotatably disposed within one of each window blind attachment orifice;
   wherein the window blind hooks are attachable to existing window blinds;
   a printed wiring board assembly affixed within the electromechanical housing;
   at least one battery in operational communication with the printed wiring board assembly;
   a motor connection removably attached to the printed wiring board assembly;
   a charging and power harness removably attached to the printed wiring board assembly;
   a plurality of toothed rack drives slidably disposed within the electromechanical housing, each rack drive having a perpendicularly affixed rack guide;
   a rack connection disposed on an each end of each toothed rack drive;
   wherein the rack connections are attachable to each other;
   a plurality of equally spaced apart rack gears, one of each rack gear rotationally engages one of each window blind attachment orifice;
   a window blind hook notch disposed within each rack gear;
   wherein one of each of the plurality of window blind hooks is removably fitted to one of each of the plurality of rack gears;
   a power assembly disposed within the electromechanical housing, the power assembly having a motor and a plurality of drive gears, each drive gear being in operational communication with the motor and at least one of the toothed rack drives, the motor being in operational communication with the printed wiring board assembly;
   wherein at least one of the plurality of toothed rack drives is slidably movable within the electromechanical housing toward the first end and alternately toward the second end;
   wherein one of the plurality of rack gears is rotated by at least one of the plurality of toothed rack drives; and
   wherein each of one of the plurality of rack gears rotates one of the plurality of window blind hooks.

2. The automatic window blind system of claim 1 wherein the plurality of operationally communicating drive gears, the toothed rack drives, and the rack gears operate in parallel.

3. The automatic window blind system of claim 1 further comprising a plurality of stand off fasteners, wherein the stand off fasteners are disposed on the printed wiring board assembly and affix the printed wiring board assembly to the electromechanical housing.

4. The automatic window blind system of claim 2 further comprising a plurality of stand off fasteners, wherein the stand off fasteners are disposed on the printed wiring board assembly and affix the printed wiring board assembly to the electromechanical housing.

5. The automatic window blind system of claim 1 further comprising a charging indicator in operational communication with the charging and power harness.

6. The automatic window blind system of claim 2 further comprising a charging indicator in operational communication with the charging and power harness.

7. The automatic window blind system of claim 3 further comprising a charging indicator in operational communication with a charging and wiring harness.

8. The automatic window blind system of claim 4 further comprising a charging indicator in operational communication with a charging and wiring harness.

9. The automatic window blind system of claim 1 further comprising:
   a light emitting diode harness removably attached to the printed wiring board assembly; and
   a light emitting diode strip disposed on the back side, wherein the light emitting diode strip in operational communication to the light emitting diode harness.

10. The automatic window blind system of claim 2 further comprising:
    a light emitting diode harness removably attached to the printed wiring board assembly; and
    a light emitting diode strip disposed on the back side, wherein the light emitting diode strip in operational communication to the light emitting diode harness.

11. The automatic window blind system of claim 3 further comprising:
    a light emitting diode harness removably attached to the printed wiring board assembly; and
    a light emitting diode strip disposed on the back side, wherein the light emitting diode strip in operational communication to the light emitting diode harness.

12. The automatic window blind system of claim 4 further comprising:
    a light emitting diode harness removably attached to the printed wiring board assembly; and
    a light emitting diode strip disposed on the back side, wherein the light emitting diode strip in operational communication to the light emitting diode harness.

13. An automatic window blind system comprising:
    an electromechanical housing having a front side and a back side spaced apart from the front side, a first end and a second end spaced apart from the first end, a top side having a pair of spaced apart L-shaped head rails, one of each head rail attached to one of each of the front side and the back side, a continuous opening disposed between the head rails, a top cover removably attached to the head rails, a bottom shelf spaced apart from the head rails between the front side and the back side, a pair of end caps, one of each end cap affixed to the first end and the second end;

a solar panel disposed on the front side;

a plurality of equally spaced apart window blind attachment orifices disposed within the bottom shelf;

a plurality of window blind hooks, one of each window blind hook removably and rotatably disposed within one of each window blind attachment orifice;

wherein the window blind hooks are attachable to existing window blinds;

a printed wiring board assembly affixed within the electromechanical housing;

at least one battery in operational communication with the printed wiring board assembly;

a motor connection removably attached to the printed wiring board assembly;

a charging and power harness removably attached to the printed wiring board assembly;

a light emitting diode harness removably attached to the printed wiring board assembly;

a light emitting diode strip disposed on the back side, wherein the light emitting diode strip in operational communication to the light emitting diode harness;

a plurality of toothed rack drives slidably disposed within the electromechanical housing, each rack drive having a perpendicularly affixed rack guide;

a rack connection disposed on an each end of each toothed rack drive;

wherein the rack connections are attachable to each other;

a plurality of equally spaced apart rack gears, one of each rack gear rotationally engages one of each window blind attachment orifice;

a window blind hook notch disposed within each rack gear;

wherein one of each of the plurality of window blind hooks is removably fitted to one of each of the plurality of rack gears;

a power assembly disposed within the electromechanical housing, the power assembly having a pancake motor, an internal planetary gear in operational communication with the pancake motor, a drive gear in operational communication with the internal planetary gear;

an optical sensor disposed on the printed wiring board assembly; and a rack sensor disposed on one of the plurality of toothed rack drives;

wherein the drive gear is in operational communication with at least one of the plurality of toothed rack drives;

wherein the plurality of rack drives is slidably movable within the electromechanical housing;

wherein the plurality of rack gears is rotated by at least one of the plurality of rack drives;

wherein each of one of the plurality of rack gears rotates one of the plurality of window blind hooks;

wherein one of each of the plurality of window blind hooks rotates an existing window blind; and wherein the optical sensor is in operational communication with the rack sensor and the printed wiring board assembly, wherein a light intensity sensed by the optical sensor controls a rotation of the motor via the printed wiring board assembly; and wherein the optical sensor in conjunction with the rack sensor controls an angular positioning of the window blinds.

14. An automatic window blind system comprising:

an electromechanical housing having a front side and a back side spaced apart from the front side, a first end and a second end spaced apart from the first end, a top side having a pair of spaced apart L-shaped head rails, one of each head rail attached to one of each of the front side and the back side, a continuous opening disposed between the head rails, a top cover removably attached to the head rails, a bottom shelf spaced apart from the head rails between the front side and the back side, a pair of end caps, one of each end cap affixed to the first end and the second end;

a solar panel disposed on the front side;

a plurality of equally spaced apart window blind attachment orifices disposed within the bottom shelf;

a plurality of window blind hooks, one of each window blind hook removably and rotatably disposed within one of each window blind attachment orifice;

wherein the window blind hooks are attachable to existing window blinds;

a printed wiring board assembly affixed within the electromechanical housing;

at least one battery in operational communication with the printed wiring board assembly;

a motor connection removably attached to the printed wiring board assembly;

a charging and power harness removably attached to the printed wiring board assembly;

a light emitting diode harness removably attached to the printed wiring board assembly;

a light emitting diode strip disposed on the back side, wherein the light emitting diode strip in operational communication to the light emitting diode harness;

a plurality of toothed rack drives slidably disposed within the electromechanical housing, each rack drive having a perpendicularly affixed rack guide;

a rack connection disposed on an each end of each toothed rack drive;

wherein the rack connections are attachable to each other;

a plurality of equally spaced apart rack gears, one of each rack gear rotationally engages one of each window blind attachment orifice;

a window blind hook notch disposed within each rack gear;

wherein one of each of the plurality of window blind hooks is removably fitted to one of each of the plurality of rack gears;

a power assembly disposed within the electromechanical housing, the power assembly having a cylindrical motor, a gear reduction in operational communication with the motor, a first bevel gear in operational communication with the gear reduction, a second bevel gear in operational communication with the first bevel gear, a drive gear in operational communication with the second bevel gear, the drive gear in operational communication with at least one of the toothed rack drives; and an optical sensor disposed on the printed wiring board assembly; and a rack sensor disposed on one of the plurality of toothed rack drives;

wherein each gear of the plurality of gears is in operational communication with at least one of the plurality of toothed rack drives;

wherein at least one of the plurality of rack drives is slidably movable within the electromechanical housing;

wherein the plurality of rack gears is rotatable by at least one of the plurality of rack drives; and wherein each of one of the plurality of rack gears rotates one of the plurality of window blind hooks;

wherein one of each of the plurality of window blind hooks rotates an existing window blind; and wherein the optical sensor is in operational communication with the rack sensor and the printed wiring board assembly, wherein a light intensity sensed by the optical sensor controls a rotation of the motor via the printed wiring board assembly; and wherein the optical sensor in conjunction with the rack sensor controls an angular positioning of the window blinds.

15. The automatic blind system of claim 14 wherein the light emitting diode strip is configured to emit a range of colors in a visible spectrum light in direct correlation with the light intensity.

\* \* \* \* \*